US011671989B1

(12) United States Patent
Chukka et al.

(10) Patent No.: US 11,671,989 B1
(45) Date of Patent: Jun. 6, 2023

(54) DYNAMIC ASSIGNMENT OF WIRELESS COMMUNICATION PROTOCOL TO ANTENNA ELEMENTS OF AN ANTENNA ARRAY

(71) Applicant: T-Mobile Innovations LLC, Overland Park, KS (US)

(72) Inventors: Chaitanya Chukka, Carol Stream, IL (US); Matthew J. Masters, Greenfield, IN (US)

(73) Assignee: T-Mobile Innovations LLC, Overland Park, KS (US)

(*) Notice: Subject to any disclaimer, the term of this patent is extended or adjusted under 35 U.S.C. 154(b) by 266 days.

(21) Appl. No.: 17/219,192

(22) Filed: Mar. 31, 2021

Related U.S. Application Data

(62) Division of application No. 16/747,950, filed on Jan. 21, 2020, now Pat. No. 11,013,009.

(51) Int. Cl.
*H04W 72/04* (2023.01)
*H04L 69/18* (2022.01)
*H04W 72/044* (2023.01)
*H04W 52/52* (2009.01)
*H04W 16/28* (2009.01)

(52) U.S. Cl.
CPC .......... *H04W 72/048* (2013.01); *H04L 69/18* (2013.01); *H04W 16/28* (2013.01); *H04W 52/52* (2013.01); *H04W 72/046* (2013.01)

(58) Field of Classification Search
CPC ............ H04L 69/18; H04W 16/00–16; H04W 16/28; H04W 28/0819; H04W 36/0022; H04W 72/12; H04W 72/1215; H04W 72/046; H04W 72/048; H04W 76/16
See application file for complete search history.

(56) References Cited

U.S. PATENT DOCUMENTS

| 8,965,450 | B2 | 2/2015 | Hofmann et al. | |
|---|---|---|---|---|
| 2012/0046003 | A1 | 2/2012 | Ying | |
| 2016/0165619 | A1* | 6/2016 | McMilin | H04W 76/15 370/329 |
| 2016/0316378 | A1 | 10/2016 | Su et al. | |
| 2019/0297633 | A1* | 9/2019 | Wu | H04W 72/10 |

FOREIGN PATENT DOCUMENTS

CN 101442393 B 10/2015

* cited by examiner

*Primary Examiner* — Ronald Eisner
(74) *Attorney, Agent, or Firm* — Shook, Hardy & Bacon, L.L.P.

(57) ABSTRACT

Methods and systems are provided for dynamically assigning a wireless communication protocol to one or more antenna elements of an antenna array. The methods can include receiving information associated with one or more user devices and, based on the received information, identifying one or more antenna elements of the antenna array, for switching between first and second wireless communication protocols. The methods can also include switching the one or more antenna elements between the first and second wireless communication protocols.

7 Claims, 8 Drawing Sheets

DYNAMIC ASSIGNMENT OF WIRELESS COMMUNICATION PROTOCOL TO ANTENNA ELEMENTS OF AN ANTENNA ARRAY

CROSS-REFERENCE TO RELATED APPLICATIONS

This is a divisional application of U.S. application Ser. No. 16/747,950, filed on Jan. 21, 2020, and entitled: "DYNAMIC ASSIGNMENT OF WIRELESS COMMUNICATION PROTOCOL TO ANTENNA ELEMENTS OF AN ANTENNA ARRAY." The contents of the aforementioned application are incorporated by reference herein in their entirety.

SUMMARY

The present disclosure is directed, in part, to the dynamic assignment of a wireless communication protocol to antenna elements of an antenna array, substantially as shown in and/or described in connection with at least one of the figures, and as set forth more completely in the claims.

In aspects set forth herein, one or more antenna elements of an antenna array may be identified and switched from one wireless communication protocol to another wireless communication protocol, based at least partly on information associated with one or more devices, including location information for the one or more devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
gNodeB Next Generation Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
NR New Radio
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, 31st Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, conventional telecommunications networks may employ base stations (e.g., cell sites, cell towers) to provide network coverage. These base stations may be utilized to broadcast and transmit transmissions to user devices of the telecommunications network. Conventionally, antenna arrays located at a base station, transmit or receive signals according to a single protocol, e.g., a 4G protocol or a 5G protocol. Currently, a significant number of legacy devices are capable of wirelessly communicating with a telecommunications networks using 4G but not 5G. For this and other reasons, certain telecommunications networks have deployed fixed, split antenna arrays, where one side or half of the array utilizes a 4G protocol, and the other side or other half of the array utilizes a 5G protocol. However, such a fixed configuration may be challenging with respect to main lobe propagation. Further, such a fixed configuration presents an imbalanced beam of coverage service for 4G and 5G, and can result in UEs not being able to utilize a desired protocol, e.g., 5G if the UE is on an opposite side of the antenna array. Additionally, the outer antenna elements of such a fixed, half-and-half configuration may begin to degrade propagation due to horizontal spacing of other antennas located on the tower.

The systems and methods disclosed herein can alleviate one or more of the problems discussed above. For instance, in aspects, the systems disclosed herein can dynamically assign a wireless communication protocol to one or more antenna elements based on information associated with one or more UEs. Such systems and methods, in aspects, can allow for various configurations of antenna elements of an antenna array to utilize a wireless communication protocol that is appropriate for the UEs in its service area. In further aspects, the systems and methods disclosed herein can provide improved overlapping propagation of two wireless communication protocols, so that any UEs in range of such an antenna array can experience improved connectivity and service.

Accordingly, in one aspect, a method for dynamically assigning a wireless communication protocol to one or more antenna elements of an antenna array is provided. The method can include receiving information associated with one or more devices, the information comprising location information for each of the one or more devices. The method can also include identifying, based on the information associated with the one or more devices, one or more antenna elements of an antenna array, for switching between a first wireless communication protocol and a second wireless communication protocol, where the identifying occurs at a first time. Additionally, the method can include switching, at a second time, the one or more antenna elements between the first wireless communication protocol and the second wireless communication protocol.

In another aspect, a system for the dynamic assignment of a wireless communication protocol for a plurality of antenna elements of an antenna array is provided. The system may include an antenna array comprising a plurality of antenna elements, where, at a first time, a first portion of the plurality of antenna elements utilizes a first wireless communication protocol and a second portion of the plurality of antenna elements utilizes a second wireless communication protocol. The second wireless communication protocol can be different than the first wireless communication protocol. The system can also include a processor configured to execute operations that include: receiving information associated with one or more devices, the information comprising location information for each of the one or more devices; identifying, based on the information associated with the one or more devices, one or more antenna elements, of the first portion of the plurality of antenna elements, for switching from the first wireless communication protocol to the second wireless communication protocol; and switching, at a second time, the one or more antenna elements of the first portion of the plurality of antenna elements from the first wireless communication protocol to the second wireless communication protocol.

As used herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

Figure 1:
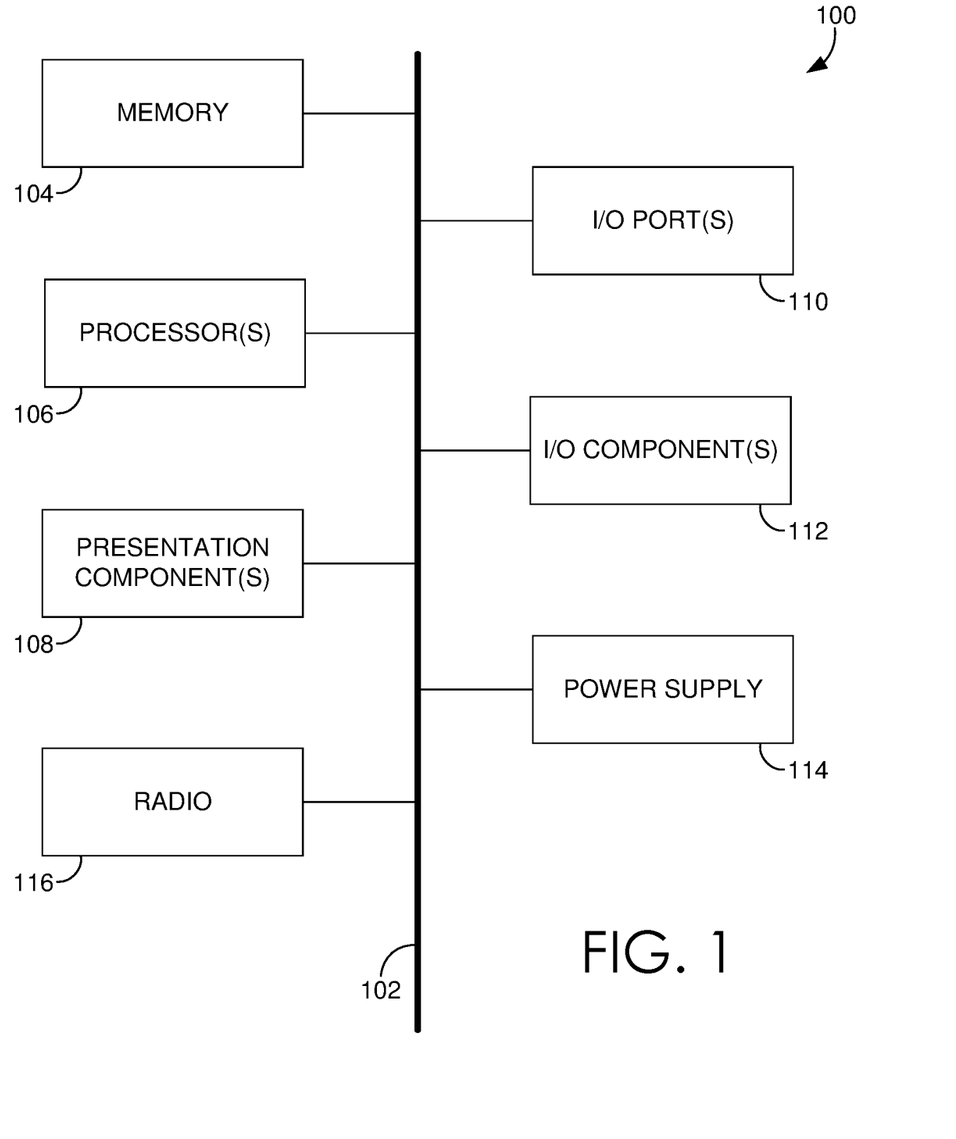
FIG. 1 depicts a diagram of an exemplary computing environment suitable for use in implementations of the present disclosure.

Referring to FIG. 1, a diagram is depicted of an example computing environment suitable for use in implementations of the present disclosure. In particular, the example computing environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, the computing device 100 includes a bus 102 that directly or indirectly couples the following devices: memory 104, one or more processors 106, one or more presentation components 108, input/output (I/O) ports 110, I/O components 112, and a power supply 114. The bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of the I/O components 112. Also, processors, such as one or more processors 106, have memory. The present disclosure recognizes that such is the nature of the art, and reiterates that FIG. 1 is merely illustrative of an example computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 104 includes computer-storage media in the form of volatile and/or nonvolatile memory. The memory 104 may be removable, nonremovable, or a combination thereof. Exemplary memory includes solid-state memory, hard drives, optical-disc drives, etc. The computing device 100 includes one or more processors 106 that read data from various entities such as bus 102, the memory 104 or the I/O components 112. One or more presentation components 108 presents data indications to a person or other device. Exemplary one or more presentation components 108 include a display device, speaker, printing component, vibrating component, etc. The I/O ports 110 allow the computing device 100 to be logically coupled to other devices including the I/O components 112, some of which may be built in the computing device 100. Illustrative I/O components 112 include a microphone, joystick, game pad, satellite dish, scanner, printer, wireless device, etc.

The radio 116 represents a radio that facilitates communication with a wireless telecommunications network. Illustrative wireless telecommunications technologies include CDMA, GPRS, TDMA, GSM, and the like. The radio 116 might additionally or alternatively facilitate other types of wireless communications including Wi-Fi, WiMAX, LTE, or other VoIP communications. As can be appreciated, in various embodiments, the radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
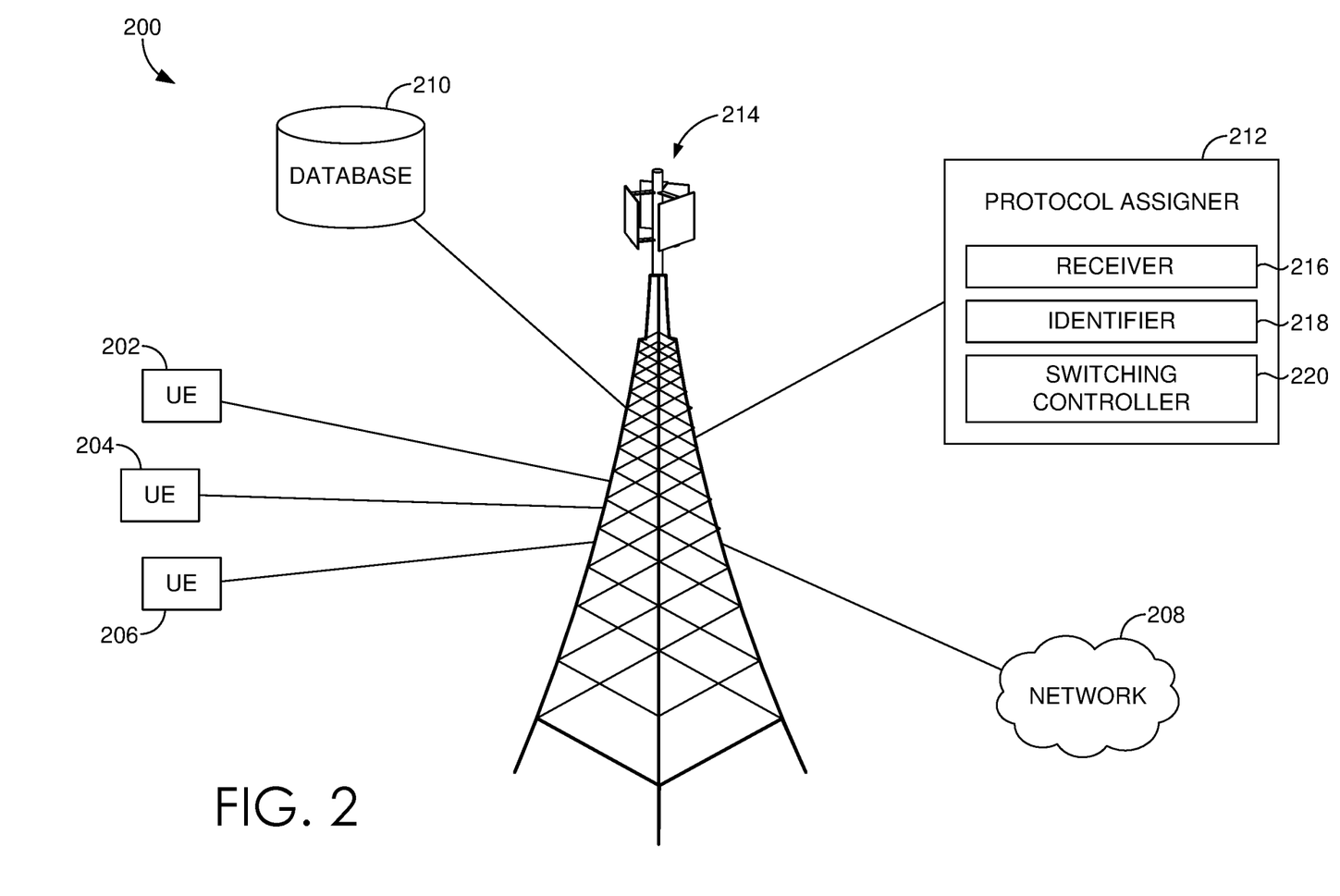
FIG. 2 illustrates a diagram of an exemplary network environment in which implementations of the present disclosure may be employed.

FIG. 2 depicts one example network environment in which implementations of the present disclosure may be employed. Such a network environment is illustrated and designated generally as a network environment 200. The network environment 200 is but one example of a suitable network environment and is not intended to suggest any limitation as to the scope of use or functionality of the invention. Neither should the network environment be interpreted as having any dependency or requirement relating to any one or combination of components illustrated.

The network environment 200 of FIG. 2 includes user devices 202, 204, and 206, a cell site 214, a network 208, a database 210, and a protocol assigner 212. In the network environment 200, the user devices 202, 204, and 206 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, or any combination thereof, or any other device that communicates via wireless communications with a cell site, e.g., the cell site 214, in order to interact with a public or private network.

In some aspects, the user devices 202, 204, and 206 can correspond to the computing device 100 of FIG. 1. Thus, a user device can include, for example, a display(s), a power source(s) (e.g., a battery), a data store(s), a speaker(s), memory, a buffer(s), a radio(s) and the like. In some implementations, a user device, e.g., one or more of the user devices 202, 204, and 206, comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some aspects, the user devices 202, 204, and 206 in the network environment 200 can optionally utilize the network 208 to communicate with other computing devices (e.g., a mobile device(s), a server(s), a personal computer(s), etc.) through the cell site 214 using any one of a plurality of wireless communication protocols, such as 3G, 4G/LTE, 5G and other related protocols. In aspects, the network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. The network 208 can include multiple networks, as well as being a network of networks, but is shown in more simple form so as to not obscure other aspects of the present disclosure.

The network 208 can be part of a telecommunication network that connects subscribers to their immediate service provider. In some instances, the network 208 can be associated with a telecommunications provider that provides services (e.g., 5G and LTE) to user devices, such as the user devices 202, 204, and 206. For example, the network 208 may provide voice, SMS, and/or data services to user devices or corresponding users that are registered or subscribed to utilize the services provided by a telecommunications provider. The network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some aspects, the cell site 214 can be configured to communicate with user devices, such as the user devices 202, 204, and 206 that are located within the geographical area, or cell, covered by radio antennas of the cell site 214. The cell site 214 may include one or more base stations, base transmitter stations, radios, antennas, antenna arrays, power amplifiers, transmitters/receivers, digital signal processors, control electronics, GPS equipment, and the like. In particular, the cell site 214 of the present disclosure may communicate with at least one user device, such as the user device 202 via a first protocol (e.g., 4G) and simultaneously or nearly simultaneously communicate with a second user device, such as the user device 204 via a second protocol (e.g., 5G).

As shown, the cell site 214 is in communication with the protocol assigner 212, which comprises various components that are utilized, in various implementations, to perform one or more methods for dynamically assigning a wireless communications protocol to one or more antenna elements of an antenna array, such as an antenna array on the cell site 214. In aspects, the protocol assigner 212 includes a receiver 216, an identifier 218, and a switching controller 220. However, in other implementations, more or less components than those shown in FIG. 2 may be utilized to carry out aspects of the systems and methods described herein. Each of the components or sub components of the protocol assigner 212 may be a stand-alone or combined processor, server, or other computer processing component that is suitably configured to perform the operations described herein.

In various aspects, the receiver 216 of the protocol assignor 212 is generally responsible for receiving information associated with one or more user devices, e.g., the user devices 202, 204, and/or 206. In aspects, the information associated with one or more user devices may be information that is relevant for dynamically assigning a wireless communications protocol to one or more antenna elements of an antenna array, of which the one or more devices may be communicating with. For instance, in certain aspects, the information associated with one or more user devices can include a physical location of the one or more devices, the communication capabilities of the one or more devices, an amount of data requested by the one or more devices, the total number of devices communicating with an antenna array, or a combination thereof. In aspects, the physical location of the one or more devices can include information regarding an absolute position (e.g., latitude and longitude, GPS, or equivalent information) and/or relative position (e.g., a distance value or range between the device and the cell site). In various aspects, the communication capabilities of the one or more devices can include information associated with what wireless communication protocols the user device is capable of communicating with, e.g., whether the user device is equipped to communication via 4G protocol, 5G protocol, or both.

In aspects, the identifier 218 utilizes and/or analyzes the information received from the receiver 216 to identify which antenna elements of an antenna array should be switched between a first wireless communication protocol and a second wireless communication protocol. In aspects, the identifier 218 can analyze a physical location of the one or more devices, the communication capabilities of the one or more devices, an amount of data requested by the one or more devices, the total number of devices communicating with an antenna array, or a combination thereof, to identify antenna elements for switching to a different wireless communication protocol than the wireless communication protocol currently being utilized for the respective antenna elements. For instance, in aspects, the identifier 218 can analyze the information associated with the one or more user devices to facilitate effective use of the antenna elements of an antenna array by the user devices. Specific use examples of the protocol assigner 212 and/or the identifier 218 utilizing the information associated with the one or more user devices to identify antenna elements for switching to a different wireless communication protocol are discussed below with reference to FIG. 4.

In aspects, once the identifier 218 has identified one or more antenna elements of the antenna array for switching between a first wireless communication protocol and a second wireless communication protocol, the switching controller 220 facilitates the switching of wireless communication protocols for the identified antenna elements. In one example aspect, the switching controller 220 can control or instruct a power amplifier associated with an antenna array, or one or more antenna elements, to adjust a power level supplied to the one or more antenna elements to effectuate or initiate switching between wireless communication protocols. For instance, in one aspect, the switching controller 220 can instruct or control a power amplifier to adjust the power being supplied to an identified antenna element in order to transmit data, e.g., data requested by a user device, using the 5G wireless communication protocol instead of a 4G wireless communication protocol. In aspects, the switching controller 220 can instruct or control, the adjustment of the phase and/or amplitude of the power supply to one or more antenna elements of the antenna array at the cell site 214.

Figure 3:
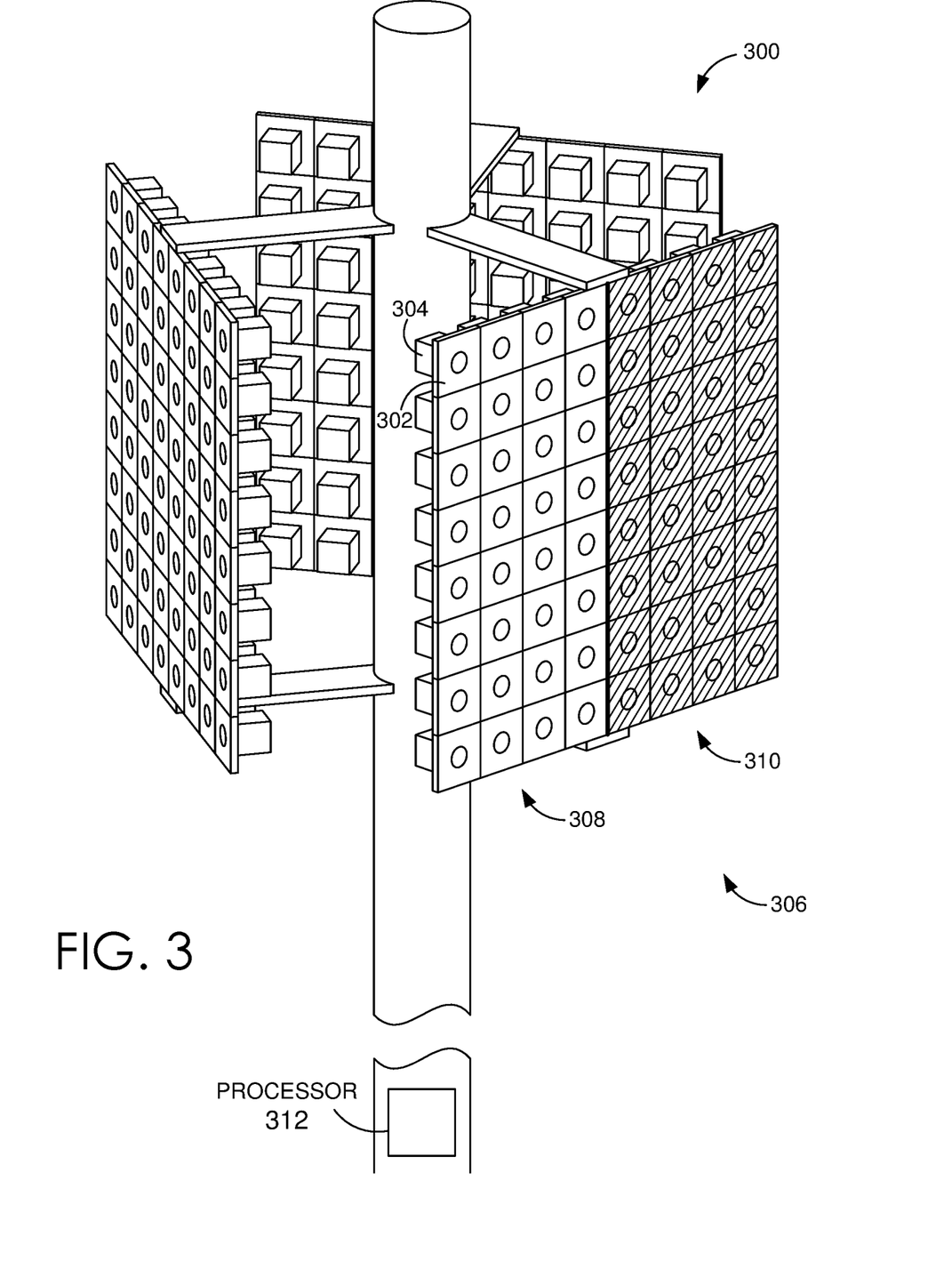
FIG. 3 depicts a schematic representation of a base station suitable for use in aspects of the present disclosure.

FIG. 3 depicts an example base station configuration suitable for use in implementing embodiments of the present disclosure and is designated generally as base station 300. Base station 300 is but one example of a suitable configuration and is not intended to suggest any limitations as to the scope of use or functionality of embodiments described herein. Neither should the configuration be interpreted as having any dependency or requirement relating to any one or combination of components illustrated.

Base station 300 comprises at least a first antenna array 306, the first antenna array 306 having one or more antenna elements 302. In aspects, the one or more antennas 302 may be dipole antennas, having a length, for example, of ¼, ½, 1, or 1½ wavelength. In aspects, the antenna array 306 may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz 30 GHz.

By way of a non-limiting example, the antenna array 306 may comprise 64 antenna elements 302 arranged in an 8×8 structure. In other aspects, the antenna array 306 may comprise antenna elements arranged in an 8×4, 4×8, or 4×4 configuration. Each antenna element 302 of the antenna array 306 comprises a dedicated power supply 304. The power supply 304 supplies power having a certain phase and amplitude to a respective antenna element 302. In an aspect, the power supply comprises a power amplifier. In various aspects, the power supply, e.g., the power supply 304, may additionally comprise a processor for controlling or adjusting the power supply to the respective antenna element 302, e.g., as discussed above with reference to the protocol assigner 212 of FIG. 2. In aspects, each power supply 304 may have a maximum power to supply to its respective antenna element 302. In aspects, the maximum per-antenna supply power may be 2.5 W, 3.5 W, 4 W, 5 W, or more.

In aspects, the antenna array 306 may comprise a first portion 308 and a second portion 310. As depicted in FIG. 3, the first portion 308 can include 4 contiguous columns of eight antenna elements each, on the left side of the antenna array 306, and the second portion 310 can include 4 contiguous columns of eight antenna elements each, on the right side of the antenna array 306. In aspects, the first portion 308 may communicate with user devices using a first wireless communication protocol, e.g., 4G, and the second portion 310 may communicate with other user devices using a second wireless communication protocol, e.g., 5G. While in this example, 4G and 5G are mentioned as wireless communication protocols, it should be understood that any wireless communication protocol standard may be utilized for example, 3G, 4G, LTE, 5G, 802.11, or any other operator-elected wireless communication protocol standard. It should be understood that the configuration or pattern of the antenna elements 302 utilizing the first wireless communications protocol or the second wireless communications protocol is just one example configuration. In aspects, this left half and right half configuration depicted in FIG. 4 may be a default configuration for the antenna array 306, where the protocol assigner 212 of FIG. 2 is utilized to analyze and/or switch all or any part of the antenna elements 302 between wireless communication protocols. FIGS. 5A and 5B provide some other example configurations and are discussed in detail below.

In aspects, the base station 300 may further comprise a processor 312. In such aspects, the processor 312 may be any one or more convenient processors, servers, computer processing components, or the like, that can be configured to perform any one or more operations of the protocol assigner 212 of FIG. 2. In some aspects, the processor 312 may be communicatively coupled to the first portion 308 and the second portion 310, and/or to each antenna element 302 of the first portion 308 and the second portion 310. In aspects, as discussed above with respect to the protocol assigner 212 of FIG. 2, the processor 312 of FIG. 3 may execute all or a part of the actions for dynamically assigning or switching a wireless communication protocol for a plurality of antenna elements of an antenna array based on information associated with one or more UEs.

Figure 4:
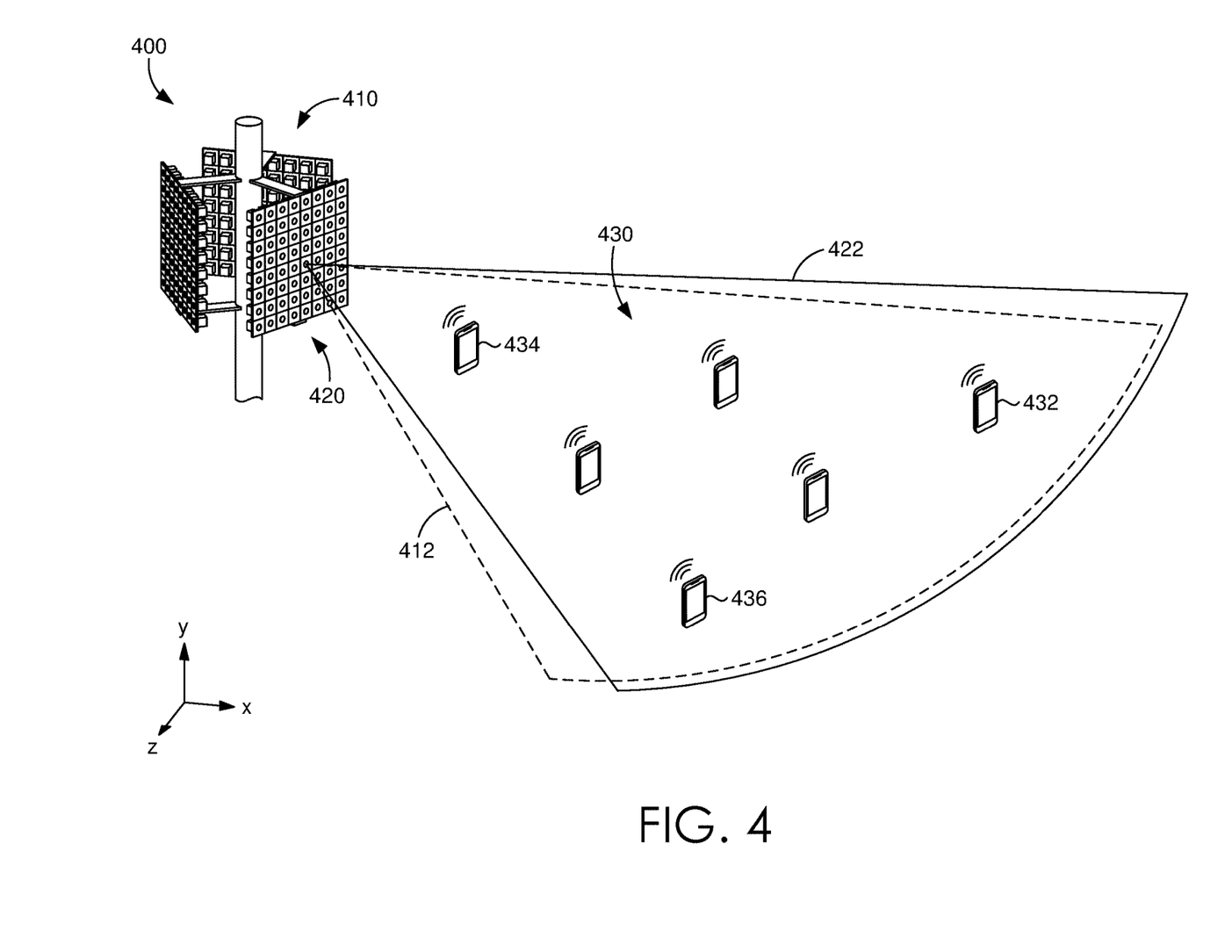
FIG. 4 depicts a system that includes a base station and a plurality of user devices in varying locations within one or more broadcast footprints of an antenna array, in accordance with aspects herein.
Figure 5A:
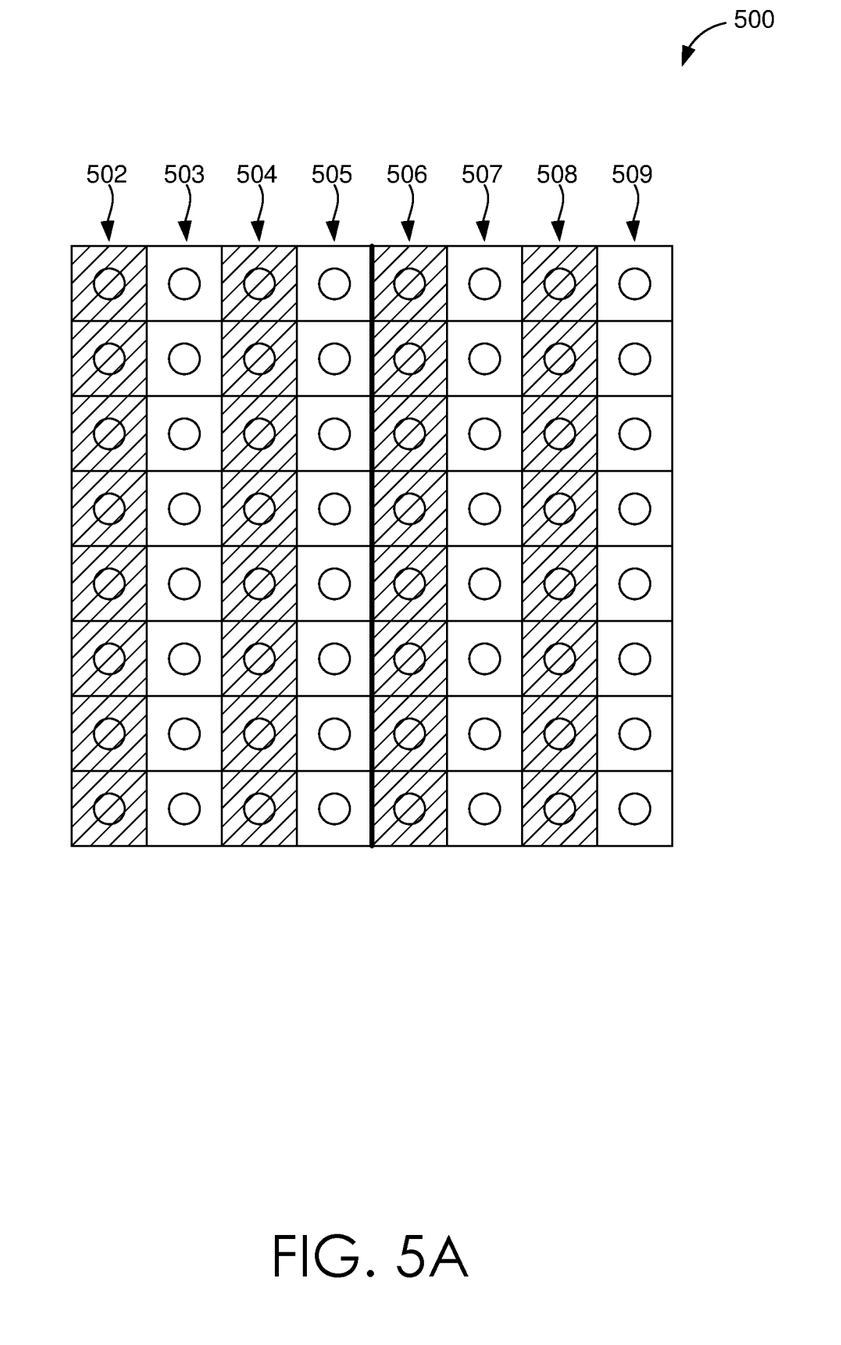
FIGS. 5A and 5B depict example configurations of various antenna elements of an antenna array utilizing a first or second wireless communication protocol, in accordance with aspects herein.
Figure 5B:
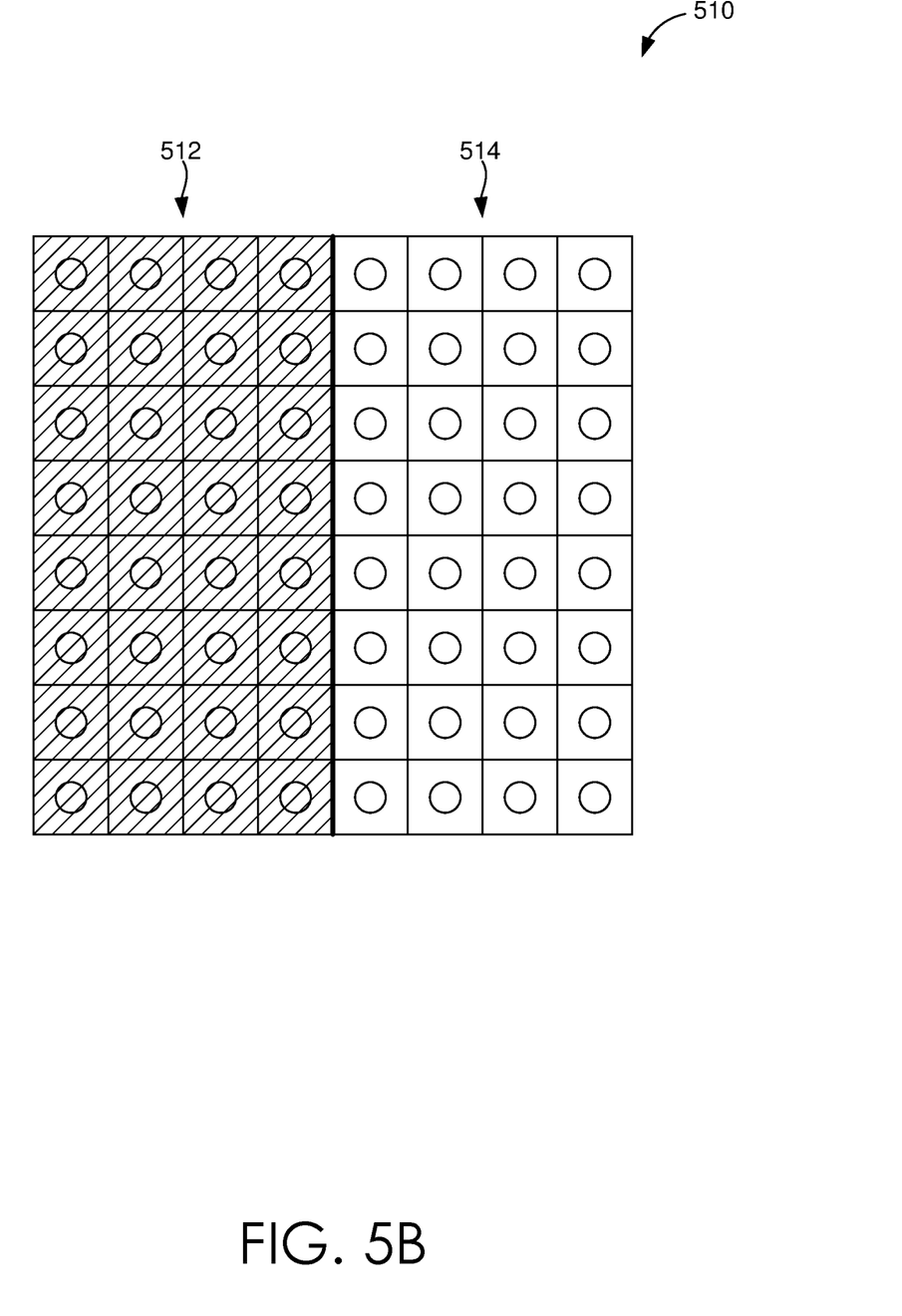

FIG. 4 depicts a system 400, e.g., a telecommunications system, that includes a base station 410 for providing wireless communication services to a plurality of user devices. In the aspect depicted in FIG. 4, the base station 410 includes an antenna array 420. In aspects, the base station 410 can include any or all of the properties and parameters of the base station 300 described above with reference to FIG. 3 and/or the network environment 200, including the cell site 214, described above with reference to FIG. 2. For instance, in aspects, the base station 410 can include a first portion of a plurality of antenna elements utilizing a first wireless communication protocol, e.g., 4G protocol, and a second portion of the plurality of antenna elements utilizing a second wireless communication protocol, e.g., 5G protocol. In the aspect depicted in FIG. 4, the base station 410 and/or antenna array 420 is communicating with a plurality of UEs 430.

In aspects, as discussed above, the systems and methods disclosed herein may receive information associated with one or more UEs to identify antenna elements for switching between one wireless communication protocol and a second wireless communication protocol. As further discussed above, in aspects, the information associated with one or more UEs can include location information of one or more UEs.

For instance in one example scenario, the UE 432, the UE 434, and the UE 436 may all be 5G capable devices and are spread apart from one another, and are at varied positions relative to the antenna array 420. In such aspects, based on this information associated with the UEs 432, 434, and 436, one or more antenna elements of the antenna array may be identified and switched from a first wireless communication protocol at a first time, e.g., 4G protocol, to a second wireless communication protocol at a second time, e.g., 5G, to provide a broadcast footprint that can more effectively provide 5G communications to the UEs 432, 434, and 436, which are at varied positions relative to the antenna array 420. In such aspects, at the first time, the antenna array 420 may have included a configuration similar to that depicted in FIG. 3, where a left half of the antenna array is configured to utilize the 4G protocol, while the second half of the antenna array is configured to utilize the 5G protocol. Further in such aspects, once the antenna array 420 has switched a portion of the antenna elements at the second time to a 5G protocol, the broadcast footprint of the antenna elements utilizing the 5G protocol may be more centered about the antenna array 420 and capable of more effectively providing 5G communication to the varied locations represented by the UEs 432, 434, and 436, such as that depicted in the broadcast footprint 422 depicted in FIG. 4.

In another example scenario, UE's, e.g., UEs 432, 434, and 436, may be requesting heavy or substantial data such as for video streaming, and are 5G capable devices. In such an aspect, like in the example above, one or more antenna elements of the antenna array 420 may be identified for switching from a non-5G wireless communication protocol to a 5G wireless communication protocol to provide increase download speeds to the varied location of the UEs 432, 434, and 436 in order more efficiently meet the UEs' current needs, e.g., by providing the broadcast footprint 422. In one aspect of this example, the protocol assigner 212 of FIG. 2 may have determined that the UEs' data request exceeded a threshold value, which facilitated identifying the one or more antenna elements for switching to a second wireless communication protocol, e.g., a 5G protocol. In such aspects, the threshold value may be about 3 Megabits per second (Mbps) or more, about 5 Mbps or more, 10 Mbps or more, or 20 Mbps or more. In the same or alternative aspects, the threshold value may be a request to download about 20 megabytes (Mb) or more, 100 Mb or more, or 500 Mb or more.

In yet another example scenario, if all of the UEs, e.g., the plurality of UEs 430, are 4G and 5G capable and their data needs can be met by a 4G protocol, the antenna array 420 may switch all of the antenna elements from a first configuration, e.g., having a portion of the antenna elements utilizing 4G and another portion utilizing 5G, to a second configuration, where all the antenna elements utilize the 4G protocol. In an alternate example scenario, all of the antenna elements can switch from a first configuration, e.g., having a portion of the antenna elements utilizing 4G and another portion utilizing 5G, to a second configuration, where all the antenna elements utilize the 5G protocol, e.g., where the plurality of UEs 430 are 5G capable and have heavy data needs.

In aspects, as discussed above, it may be desirable that an antenna array, e.g., the antenna array 420 that is utilizing two distinct wireless communication protocols, provide overlapping propagation of the two wireless communication protocols, so that any UEs in range of such an antenna array can experience improved connectivity and service regardless of the protocol being used. In such aspects, the broadcast footprint 412 depicted in FIG. 4 can represent the broadcast footprint provided by the portion of antenna elements of the antenna array 420 utilizing a first wireless communication protocol, e.g., the 4G protocol. Further, in such aspects, as discussed above, the broadcast footprint 422 depicted in FIG. 4 can represent the broadcast footprint provided by the portion of the antenna elements of the antenna array 420 utilizing a second wireless communication protocol, e.g., the 5G protocol, where the broadcast footprint 422 substantially overlaps with the broadcast footprint 412. In such aspects, these overlapping broadcast footprints of different wireless communication protocols can facilitate improved connectivity and service.

FIGS. 5A and 5B depict different aspects of configurations of antenna elements of an antenna array with a first portion of antenna elements utilizing a first wireless communication protocol and a second portion of antenna elements utilizing a second wireless communication protocol. It should be understood that while the aspects of FIGS. 5A and 5B depict antenna arrays having eight columns of eight antenna elements each, other antenna array configurations are possible and contemplated by the disclosed herein. For instance, other configurations of an antenna array can include, but are not limited to, 16 columns of 4 antenna elements each, 4 columns of 16 antenna elements each, 32 columns of 2 antenna elements each, and so on.

As can be seen in FIG. 5A, the antenna array 500 includes alternating columns of antenna elements, where a column of antenna elements utilizing a first wireless communication protocol is adjacent or alternated with a column of antenna elements utilizing a second wireless communication protocol. For instance, columns 502, 504, 506, and 508 can utilize a first wireless communication protocol, while columns 503, 505, 507, and 509 can utilize a second wireless communication protocol. In aspects, the configuration of columns utilizing a first wireless communication protocol alternating with columns utilizing a second wireless communication protocol can provide overlapping broadcast footprints, to effectively serve UEs within the service area of the base station or antenna array no matter what wireless communication protocol such UEs are capable of communicating with.

FIG. 5B represents another example configuration of an antenna array 510 that is the opposite configuration of that depicted in the antenna array 306 of FIG. 3. As can be seen in FIG. 5B, the antenna array 510 includes four contiguous columns 512 on the left side of the antenna array 510 that are configured to utilize a second wireless communication protocol, e.g., 5G protocol, and the four contiguous columns 514 on the right side of the antenna array 510 are configured to utilize a first wireless communication protocol, e.g., 4G protocol. This configuration in FIG. 5B, e.g., the left half utilizing the 5G protocol, and the right half utilizing the 4G protocol is the opposite configuration of that depicted in FIG. 3, e.g., the left half utilizing the 4G protocol, and the right half utilizing the 5G protocol.

It should be understood that FIGS. 5A and 5B are just two example configurations of various antenna elements utilizing differing wireless communication protocols and that other configurations are also contemplated by the systems and methods disclosed herein. For example in one aspect, an antenna array can include alternating rows of antenna elements, where alternating rows of antenna elements utilize a first wireless communication protocol, and adjacent alternating rows of antenna elements utilize a second wireless communication protocol. In such an example antenna array configuration, each column of the antenna elements could include antenna elements utilizing the first wireless communication protocol and antenna elements utilizing the second wireless communication protocol.

In aspects, as discussed above, the systems and methods described herein may analyze information associated with one or more UEs to identify antenna elements within an antenna array for switching between a first wireless communication protocol and a second wireless communication protocol. Further, in aspects, the systems and methods described herein identify and switch antenna elements from one protocol to another protocol in order to effectively utilize the telecommunication resources based on UEs' capabilities, locations, and data needs. Accordingly, in various aspects, the systems and methods disclosed herein may switch from a first configuration of an antenna array, such as the configuration depicted in the antenna array 306 of FIG. 3, to a second configuration, such as the configuration depicted in the antenna array 500 of FIG. 5A or the antenna array 510 of FIG. 5B.

In certain aspects as discussed above, the dynamic assignment of wireless communication protocols to one or more antenna elements of an antenna array based on information associated with a plurality of UEs can facilitate the effective allocation of telecommunications resources for the plurality of UEs. For instance, in certain aspects, the systems and methods disclosed herein may receive information associated with a first UE and identify one or more antenna elements for switching from one wireless communication protocol to another wireless communication protocol, in order to benefit the data needs of the first UE for a specified time period, and then thereafter, based on information associated with a second UE, the systems disclosed herein may identify and switch one or more antenna elements to a different wireless communication protocol to benefit the second UE's data needs.

Figure 6:
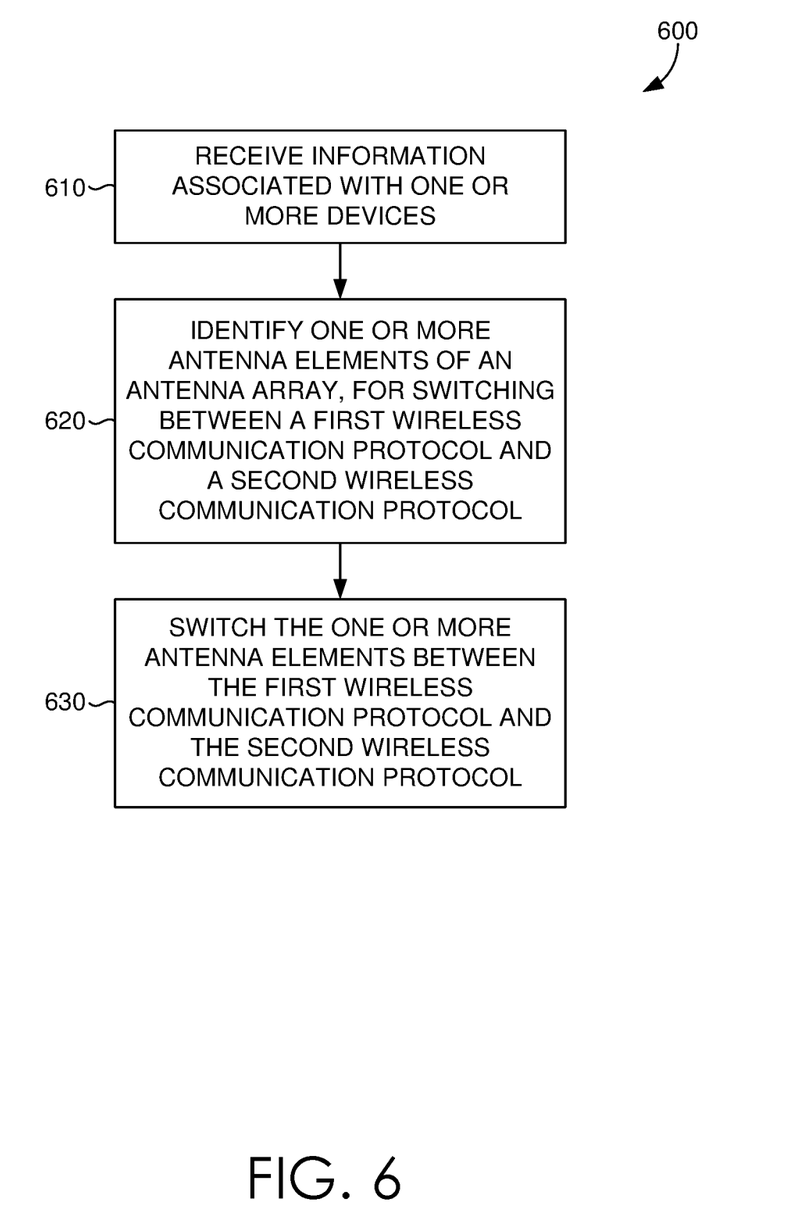
FIG. 6 depicts a flow diagram of an exemplary method for dynamically assigning a wireless communication protocol to one or more antenna elements of an antenna array, in accordance with aspects of the present disclosure.

FIG. 6 is a flow chart of a method 600 for dynamically assigning a wireless communication protocol to one or more antenna elements of an antenna array. In step 610 of the method 600, information associated with one or more devices, e.g., UEs, is received. In aspects, the information can be received by the receiver 216 of the protocol assigner 212 of the system 200 discussed above with reference to FIG. 2. In various aspects, the information associated with the one or more devices can include location information for each of the one or more devices. In the same or alternative aspects, the information associated with the one or more devices can include a total number of the one or more devices communicating with the antenna array, the communication capabilities of the one or more devices, an amount of data requested by the one or more devices, or a combination thereof.

Step 620 of the method 600, includes identifying one or more antenna elements for switching between a first wireless communication protocol and a second wireless communication protocol. In aspects, the identifying in the step 620 can be based on the information associated with the one or more devices that was received in the step 610 of the method 600. In one aspect, the step 620 can be performed via the identifier 218 of the protocol assigner 212 of the system 200 discussed above with reference to FIG. 2. In certain aspects, the step 620 can result in identifying, at a first time, one or more antenna elements identified for switching between a first wireless communication protocol and a second wireless communication protocol in order to meet the data needs or connectivity needs of one or more UEs based on their location. In various aspects, the step 620 can result in identifying one or more antenna elements for switching protocols, so as to provide substantially overlapping coverage of two distinct wireless communication protocols, e.g., 4G protocol and 5G protocol.

Step 630 of the method 600 includes switching the one or more antenna elements between the first wireless communication protocol and the second wireless communication protocol, at a second time. In aspects, the step 630 is performed after the one or more antenna elements have been identified for switching protocols in the step 620. In certain aspects, the switching controller 220 of the protocol assigner 212 of the system 200 described above with reference to FIG. 2 can be utilized to perform the step 630. In certain aspects, as discussed above, switching between wireless communication protocols can include switching a set of one or more antenna elements from a first wireless communication protocol to a second wireless communication protocol, and/or switching another set of one or more antenna elements from the second wireless communication protocol to the first wireless communication protocol. In various aspects as also discussed above, switching between wireless communication protocols can include instructing at least one power amplifier coupled to the antenna array or to one or more antenna elements to adjust a power level being supplied to the one or more antenna elements. In various aspects, switching between wireless communication protocols can result in a configuration of antenna elements using various protocols as depicted in FIG. 5A or 5B, or any other configuration contemplated herein.

Figure 7:
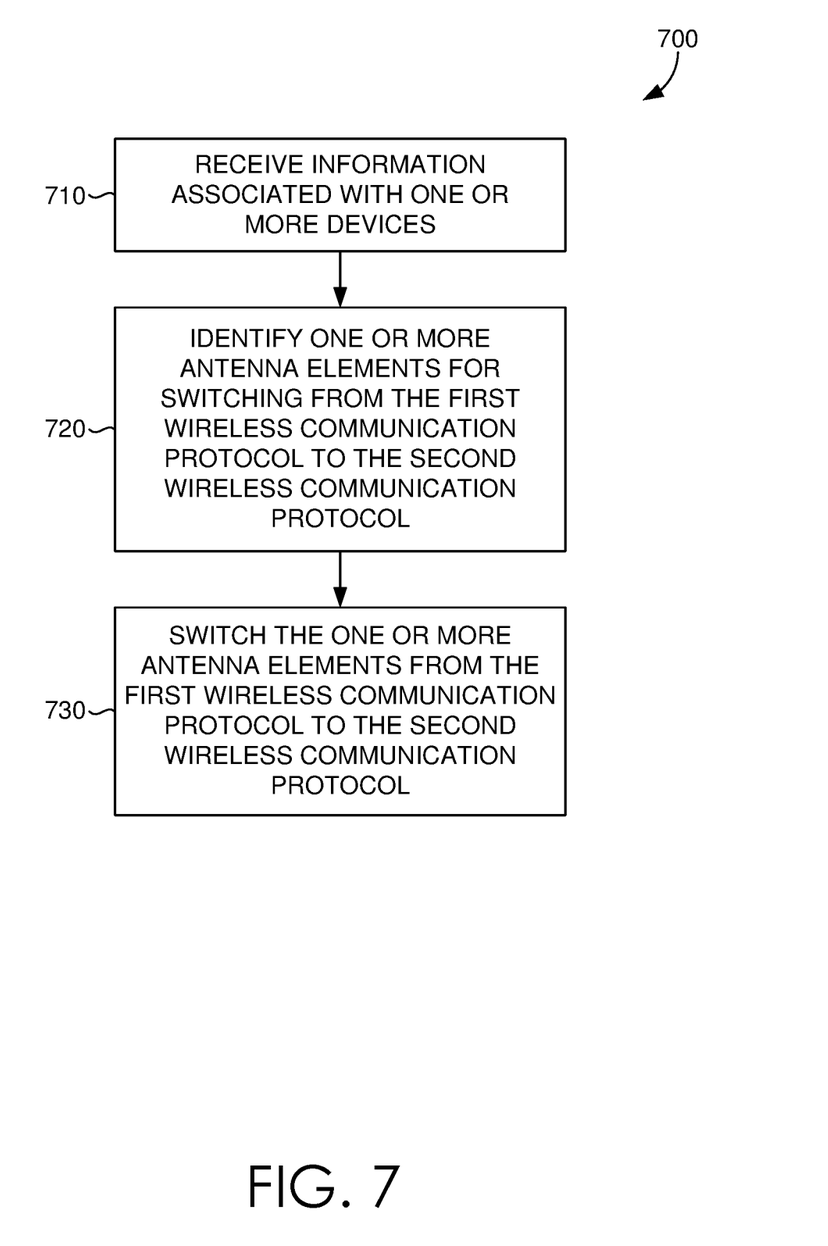
FIG. 7 depicts a flow diagram of another exemplary method for dynamically assigning a wireless communication protocol to one or more antenna elements of an antenna array, in accordance with aspects of the present disclosure.

FIG. 7 is a flow chart of a method 700 for dynamically assigning a wireless communication protocol to one or more antenna elements of an antenna array. In aspects, at a first time, the antenna array can include a first portion of a plurality of antenna elements that utilizes a first wireless communication protocol and a second portion of the plurality of antenna elements that utilizes a second wireless communication protocol, where the second wireless communication protocol is different from the first wireless communication protocol. For instance, the first wireless communication protocol can be a 4G protocol, and the second wireless communication protocol can be a 5G protocol.

In step 710 of the method 700, information associated with one or more devices, e.g., UEs, is received. In aspects, the information can be received by the receiver 216 of the protocol assigner 212 of the system 200 discussed above with reference to FIG. 2. In various aspects, the information associated with the one or more devices can include location information for each of the one or more devices. In the same or alternative aspects, the information associated with the one or more devices can include a total number of the one or more devices communicating with the antenna array, the communication capabilities of the one or more devices, an amount of data requested by the one or more devices, or a combination thereof.

Step 720 of the method 700, includes identifying one or more antenna elements of the first portion of antenna elements for switching from utilizing the first wireless communication protocol to utilizing the second wireless communication protocol. In aspects, the identifying of the step 720 can be based on the information associated with the one or more devices that was received in the step 710 of the method 700. In one aspect, the step 720 can be performed via the identifier 218 of the protocol assigner 212 of the system 200 discussed above with reference to FIG. 2.

Step 730 of the method 700 includes switching the one or more antenna elements of the first portion of antenna elements from utilizing the first wireless communication protocol to utilizing the second wireless communication protocol, at a second time. In aspects, the step 730 is performed after the one or more antenna elements have been identified for switching protocols in the step 720. In certain aspects, the switching controller 220 of the protocol assigner 212 of the system 200 described above with reference to FIG. 2 can be utilized to perform the step 730. In various aspects as also discussed above, switching between wireless communication protocols can include instructing at least one power amplifier coupled to the antenna array or to one or more antenna elements to adjust a power level being supplied to the one or more antenna elements. In various aspects, switching between wireless communication protocols can result in a configuration of antenna elements using various protocols as depicted in FIG. 5A or 5B, or any other configuration contemplated herein.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamic assignment of a wireless communication protocol for a plurality of antenna elements of an antenna array, the system comprising:
   an antenna array comprising a plurality of antenna elements, wherein, at a first time, a first portion of the plurality of antenna elements utilizes a first wireless communication protocol and a second portion of the plurality of antenna elements utilizes a second wireless communication protocol, the second wireless communication protocol different than the first wireless communication protocol; and a processor configured to execute operations comprising:
   receiving information associated with one or more devices, the information comprising location information for each of the one or more devices;
   identifying, based on the information associated with the one or more devices, one or more antenna elements, of the first portion of the plurality of antenna elements, for switching from the first wireless communication protocol to the second wireless communication protocol; and
   switching, at a second time, the one or more antenna elements of the first portion of the plurality of antenna elements from the first wireless communication protocol to the second wireless communication protocol.

2. The system of claim 1, wherein the information associated with the one or more devices further comprises: a total number of the one or more devices communicating with the antenna array, communication capabilities of the one or more devices, an amount of data requested by the one or more devices, or a combination thereof.

3. The system of claim 1, wherein the first wireless communication protocol is associated with 4G, and wherein the second wireless communication protocol is associated with 5G.

4. The system of claim 1, wherein the plurality of antenna elements are arranged in a plurality of columns of antenna elements, wherein at the second time, the plurality of columns of antenna elements comprise alternating columns of antenna elements utilizing the first wireless communication protocol and columns of antenna elements utilizing the second wireless communication protocol.

5. The system of claim 1, wherein the plurality of antenna elements are arranged in a plurality of columns of antenna elements, and wherein at the second time, each of the plurality of columns of antenna elements comprises antenna elements utilizing the second wireless communication protocol and not the first wireless communication protocol.

6. The system of claim 1, wherein the plurality of antenna elements are arranged in a plurality of columns of antenna elements, and wherein at the second time, the plurality of columns of antenna elements are configured such that at least four contiguous columns of antenna elements utilize the first wireless communication protocol and that at least four contiguous columns of antenna elements utilize the second wireless communication protocol.

7. The system of claim 1, further comprising at least one power amplifier, wherein the at least one power amplifier is coupled to the antenna array and adapted to provide power to at least one of the plurality of antenna elements, and wherein the switching comprises instructing the at least one power amplifier to adjust a power level supplied to the one or more antenna elements of the first portion of the plurality of antenna elements.

* * * * *